United States Patent [19]

Beadle

[11] 3,969,315

[45] July 13, 1976

[54] SYNERGISTIC ANTIOXIDANT COMBINATION OF ORGANIC PHOSPHITE AND AMINE

[75] Inventor: Howard C. Beadle, Norwalk, Conn.

[73] Assignee: R. T. Vanderbilt Company, Inc., Norwalk, Conn.

[22] Filed: Mar. 10, 1975

[21] Appl. No.: 556,672

Related U.S. Application Data

[62] Division of Ser. No. 391,235, Aug. 24, 1973, Pat. No. 3,886,114.

[52] U.S. Cl. .............. 260/45.8 NW; 260/45.7 PH; 260/45.9 QB; 260/459 QA; 260/45.95 C; 260/800; 252/401; 252/404; 252/407
[51] Int. Cl.² .......................................... C08D 7/10
[58] Field of Search ............ 260/45.7 PH, 45.8 NW, 260/45.9 QB, 45.9 QA, 45.95 C, 45.95 H, 800, 802, 805

[56] References Cited
UNITED STATES PATENTS

| | | | |
|---|---|---|---|
| 3,047,608 | 7/1962 | Friedman et al. | 260/45.7 PH |
| 3,080,338 | 3/1963 | Nudenberg et al. | 260/45.7 PH |
| 3,419,524 | 12/1968 | Larrison | 260/45.7 PH |
| 3,454,521 | 7/1969 | Tholotrup | 260/45.85 S |
| 3,714,116 | 1/1973 | Scalco | 260/45.7 PH |
| 3,845,168 | 10/1974 | Guttag | 260/45.7 PH |

OTHER PUBLICATIONS

Atmospheric Oxidation and Antioxidants by General Scott – 1965; pp. 198, 203 to 212, 217 to 219, 405 to 407, and 441 to 463.

*Primary Examiner*—V.P. Hoke
*Attorney, Agent, or Firm*—Brumbaugh, Graves, Donohue & Raymond

[57] ABSTRACT

The specification relates to a synergistic combination of a phosphite and either a phenol or an amine. The specification relates also to the use of this combination as an antioxidant for natural rubber.

9 Claims, No Drawings

SYNERGISTIC ANTIOXIDANT COMBINATION OF ORGANIC PHOSPHITE AND AMINE

This is a division of application Ser. No. 391,235, filed Aug. 24, 1973, now U.S. Pat. No. 3,886,114.

BACKGROUND OF THE INVENTION

It is known to incorporate various compounds in natural and synthetic polymeric compounds, e.g., natural rubber, in order to prevent degradation resulting from atmospheric oxygen, ultraviolet light, and heat. In the past, these compounds have included phosphites, phenols, and amines (U.S. Pat. Nos. 3,080,338; 3,115,465; 3,243,394; 3,355,419; 3,369,059; 3,375,304; 3,377,315; 3,382,299; 3,406,143; 3,419,524; 3,425,987; 3,516,963; 3,535,277; 3,560,432; and 3,629,372; German Offenlegungsschrift No. 2,232,306; British Pat. Nos. 905,824 and 921,509). However, these compounds, under certain circumstances, have not provided the desired degree of protection of the polymer, especially against deterioration from exposure to atmospheric oxygen and heat.

SUMMARY OF THE INVENTION

It has now been discovered that elastomeric polymers, such as natural rubber, can be protected against oxidative deterioration by employing a synergistic combination of compounds. Thus, in accordance with one embodiment of the invention, natural rubber is compounded with a mixture of (1) an alkyl phenyl propylene glycol phosphite and (2a) a phenol or (2b) an amine or mixtures thereof.

DESCRIPTION OF THE INVENTION

The first component (1) in the synergistic combination is an alkyl phenyl propylene glycol phosphite. This compound is known in the aforementioned patents which are included herein by reference. Preferably, the phosphites have a molecular weight of between about 425 and 2100 and have a phosphorus content of between about 4.5 and 11.8%. Suitable compounds are decakis(nonylphenyl)heptakis (dipropylene glycol)octaphosphite (DHOP), tetrakis(nonylphenyl)polypropylene glycol 425 diphosphite (TPDP 425), polyphenyl dipropylene glycol phosphite (AHOP), tetraphenyl dipropylene glycol diphosphite (TP-DPG-DP) and mixtures thereof.

The synergistic combination also has either a phenol (2a), an amine (2b), or mixtures thereof. Both the phenolic and amine antioxidants are well-known in the art as evidenced by the aforementioned patents which are included herein by reference. The following phenolic antioxidants and other phenolic compounds, among others, are satisfactory: mixed polybutylated bisphenol A (4,4'-isopropylidene diphenol) (Agerite Superlite), 2,6-di-t-butyl-4-methylphenol, styrenated phenol (Agerite Spar), 2,2'-methylenebis(4-methyl-6-t-butylphenol) (American Cyanamid Co. Antioxidant 2246), hindered phenol (United States Rubber Co. Antioxidant 439), 4,4'-dihydroxydiphenol, 4,4'-thiobis(6-t-butyl-o-cresol) (Ethyl 736), p-butylphenol, p-isopropylphenol, p-(1,1,3,3-tetramethylbutyl)-phenol, thymol, mixed m- and p-cresol, p-nonylphenol, other phenols, and cresols having alkyl substituents and mixtures thereof. Amine antioxidants may include, among others, the following: polymerized 1,2-dihydro-2,2,4-trimethylquinoline (Agerite Resin D), N,N -di(2-octyl)-p-phenylenediamine (Antozite 1), N,N'-diphenyl-p-phenylenediamine, diphenylamine-acetone reaction product, phenyl-β-naphthylamine (Agerite Powder), other aromatic amines, diphenylamines, and mixtures thereof. Generally, the antioxidant combination has about 0.50 to 1.75, preferably about 0.75 to 1.75, parts phosphite to about 1.50 to 0.25, preferably about 1.25 to 0.25, parts phenol or amine antioxiant.

The antioxidant combination of the invention can be added to natural rubber or the like in an amount ranging from about 0.25 to 5 parts per hundred parts of rubber (phr). The synergistic combination can be employed with a rubber latex, a rubber solution, and a solid rubber to retard the oxidative deterioration of the rubbery polymer during polymerization. The components of the synergistic mixture may be combined before addition to the rubber or each component may be added separately to the rubber. The rubber may contain also conventional compounding ingredients, such as accelerators, stabilizers, antiozonants, carbon blacks, fillers, plasticizers, and mixtures thereof.

The new antioxidant combination, with or without other ingredients, may be included by any suitable method used in the rubber industry, such as mechanical mixing or other conventional compounding methods. The compounded rubber may be cured to a vulcanizate in accordance with a known procedure, such as press-curing at elevated temperatures.

Thus, in accordance with this invention, natural rubber is protected against oxidative deterioration effectively by using as antioxidant a combination of certain phosphites with certain phenols or certain amines. The synergistic results of the invention are evident when the polymer containing the new antioxidant combination is subjected to extended heat aging. The protection afforded by the antioxidant combination of the invention is excellent, whereas the same amount of the phosphite alone, the phenol alone, or the amine alone is not satisfactory under the same conditions.

Furthermore, synergism is produced by combining a phosphite containing propylene glycol residuals and a phenolic compound, such as p-nonylphenol or p-t-butylphenol, which heretofore usually exhibit low antioxidant characteristics. Besides being much less expensive, the new antioxidant combination provides a vulcanizate with improved mechanical and physical properties following heat aging as compared to using each component alone.

The following examples are submitted to illustrate, but not to limit, this invention. Unless otherwise indicated, all parts and percentages in the specification and claims are based upon weight.

EXAMPLE 1

Natural rubber was compounded with the following components and press-cured subsequently for 15 min. at 290°F.

| Components | Parts by Weight |
| --- | --- |
| Natural Rubber (Select A) | 100 |
| Stearic Acid | 2 |
| ZnO | 5 |
| TiO$_2$ | 50 |
| Sulfur | 2.75 |
| Benzothiazyl Disulfide (ALTAX) | 1.0 |
| Tetramethylthiuram Disulfide (Methyl Tuads) | 0.1 |
| Antioxidant (s) | 2 |

As shown in Table I, samples of vulcanized rubber contained as an antioxidant polybutylated bisphenol A alone, decakis(nonylphenyl)heptakis(dipropylene glycol) octaphosphite (DHOP) alone, and mixtures of both. There was also a control. The samples were aged in test tubes (Al blocks) for 4 days at 212°F. The percent tensile retention and percent elongation were determined according to ASTM D-412 Test Method. The results are listed in Table I.

This example demonstrates the synergistic effect obtained by using a mixture of the specified phosphite and the specific phenol as compared by using either alone.

EXAMPLE 2

The formulation of Example 1 was compounded as indicated in Table II with 1:1 mixtures of various phosphites with various phenols or with various amines. For comparative purposes, each formulation was compounded with only one component. There was also a control. The total amount of phosphite, phenol and amine in each sample was 2 phr. Each sample was press-cured to optimum cure at 290°F. The vulcanized rubber was aged in test tubes (Al blocks) for 2 days at 212°F. Tensile strength was determined according to ASTM D-412 Test Method. Table II specifies the results.

Table I

| Antioxidant | A | B | C | D | E | F | G | H | I |
|---|---|---|---|---|---|---|---|---|---|
| Mixed polybutylated bisphenol A (phr) | — | 2.00 | 1.50 | 1.25 | 1.00 | 0.75 | 0.50 | 0.25 | — |
| Decakis(nonylphenyl)heptakis(dipropylene glycol) octaphosphite (DHOP) | — | — | 0.50 | 0.75 | 1.00 | 1.25 | 1.50 | 1.75 | 2.00 |
| Percent retained tensile strength aged for 4 days | 6 | 19 | 37 | 32 | 49 | 50 | 51 | 32 | 11 |
| Percent retained elongation at break aged for 4 days | 32 | 44 | 60 | 58 | 66 | 71 | 75 | 66 | 46 |

TABLE II

| Sample | Phosphite | Phenol or Amine | Percent Retention of Tensile Strength After Aging for 2 Days |
|---|---|---|---|
| A | None | None | 26.6 |
| B-1 | Decakis(nonylphenyl)heptakis(dipropylene glycol) octaphosphite (DHOP) | None | 31.0 |
| B-2 | None | 2,6-Di-t-butyl-4-methylphenol | 40.4 |
| B-3 | DHOP | 2,6-Di-t-butyl-4-methylphenol | 73.8 |
| C-1 | DHOP | None | 31.0 |
| C-2 | None | Styrenated phenol (Agerite Spar) | 57.5 |
| C-3 | DHOP | Styrenated phenol (Agerite Spar) | 70.5 |
| D-1 | DHOP | None | 31.0 |
| D-2 | None | 2,2'-Methylenebis(4-methyl-6-t-butylphenol) | 42.5 |
| D-3 | DHOP | 2,2'-Methylenebis(4-methyl-6-t-butylphenol) | 72.5 |
| E-1 | DHOP | None | 31.0 |
| E-2 | None | Hindered phenol (Antioxidant 439) | 45.0 |
| E-3 | DHOP | Hindered phenol (Antioxidant 439) | 61.1 |
| F-1 | DHOP | None | 31.0 |
| F-2 | None | 4,4'-Dihydroxydiphenol | 27.6 |
| F-3 | DHOP | 4,4'-Dihydroxydiphenol | 59.9 |
| G-1 | DHOP | None | 31.0 |
| G-2 | None | 4,4'-Thiobis(6-t-butyl-o-cresol) | 47.8 |
| G-3 | DHOP | 4,4'-Thiobis(6-t-butyl-o-cresol) | 74.9 |
| H-1 | DHOP | None | 31.0 |
| H-2 | None | Polymerized 1,2-dihydro-2,2,4-trimethylquinoline | 59.0 |
| H-3 | DHOP | Polymerized 1,2-dihydro-2,2,4-trimethylquinoline | 78.1 |
| J-1 | DHOP | None | 31.0 |
| J-2 | None | N,N'-di(2-octyl)-p-phenylenediamine | 59.2 |
| J-3 | DHOP | N,N'-di(2-octyl)-p-phenylenediamine | 80.4 |
| K-1 | DHOP | None | 31.0 |
| K-2 | None | N,N'-Diphenyl-p-phenylenediamine (DPPD) | 49.7 |
| K-3 | DHOP | N,N'-Diphenyl-p-phenylenediamine (DPPD) | 83.7 |
| L-1 | DHOP | None | 31.0 |
| L-2 | None | Phenyl-β-naphthylamine | 51.4 |
| L-3 | DHOP | Phenyl-β-naphthylamine | 83.5 |
| M-1 | DHOP | None | 41.1 |
| M-2 | None | Diphenylamine-acetone reaction product | 72.0 |
| M-3 | DHOP | Diphenylamine-acetone reaction product | 89.3 |
| N-1 | Polyphenyl dipropylene glyol phosphite (AHOP) | None | 51.9 |
| N-2 | None | Polybutylated bisphenol A | 31.8 |
| N-3 | AHOP | Polybutylated bisphenol A | 68.1 |
| O-1 | Tetraphenyl dipropylene glycol diphosphite (TP-DPG-DP) | None | 39.4 |
| O-2 | None | Polybutylated bisphenol A | 31.8 |
| O-3 | TP-DPG-DP | Polybutylated bisphenol A | 59.9 |
| P-1 | Tetrakis(nonylphenyl) polypropyleneglycol 425 diphosphite (TPDP 425) | None | 52.1 |

TABLE II-continued

| Sample | Phosphite | Phenol or Amine | Percent Retention of Tensile Strength After Aging for 2 Days |
|---|---|---|---|
| P-2 | None | Polybutylated bisphenol A | 31.8 |
| P-3 | TPDP 425 | Polybutylated bisphenol A | 78.0 |

It is manifest from this example that an equal amount of combined antioxidants produced rubber compounds with considerably better physical properties following aging than those containing only the phosphite, the phenol or the amine.

EXAMPLE 3

By following the procedure of Example 1, vulcanizates were prepared with 1:1 mixtures of DHOP and phenols which normally possess low antioxidant properties. Each component also was used alone and a control was prepared. Each sample has a total of 2 phr of phosphite and phenol. The percent retention was determined as described in Example 2. The resulting data are found in Table III.

Table III

| Sample | Phosphite | Phenol or Amine | Percent Retention of Tensile Strength After Aging for 2 Days |
|---|---|---|---|
| A | None | None | 16.0 |
| B-1 | Decakis(nonylphenyl)heptakis(dipropylene glycol) octaphosphite (DHOP) | None | 42.6 |
| B-2 | None | p-t-Butylphenol | 50.0 |
| B-3 | DHOP | p-t-Butylphenol | 66.1 |
| C-1 | DHOP | None | 42.6 |
| C-2 | None | p-Isopropylphenol | 41.6 |
| C-3 | DHOP | p-Isopropylphenol | 51.1 |
| D-1 | DHOP | None | 42.6 |
| D-2 | None | p-(1,1,3,3-Tetramethylbutyl)phenol | 47.7 |
| D-3 | DHOP | p-(1,1,3,3-Tetramethylbutyl)phenol | 51.5 |
| E-1 | DHOP | None | 42.6 |
| E-2 | None | Thymol | 31.8 |
| E-3 | DHOP | Thymol | 50.8 |
| F-1 | DHOP | None | 42.6 |
| F-2 | None | Mixed m- and p-cresol | 36.3 |
| F-3 | DHOP | Mixed m- and p-cresol | 57.0 |
| G-1 | DHOP | None | 42.6 |
| G-2 | None | p-Nonylphenol | 46.4 |
| G-3 | DHOP | p-Nonylphenol | 60.6 |

Synergism is shown in the antioxidant combinations tested in this example.

Having set forth the general nature and specific embodiments of the present invention, the true scope is now particularly pointed out in the appended claims.

What is claimed is:

1. A synergistic mixture for protecting natural rubber against heat and oxidation degradation which consists essentially of about 0.50 to 1.75 parts of a phosphite selected from the group consisting of decakis (nonylphenyl) heptakis (dipropylene glycol) octaphosphite, tetrakis (nonylphenyl) polypropylene glycol 425 diphosphite, polyphenyl dipropylene glycol phosphite and mixtures thereof, and about 1.50 to 0.25 parts of an amine selected from the group consisting of polymerized 1,2-dihydro-2,2,4-trimethylquinoline, N,N'-di(2-octyl)-p-phenylenediamine, N,N'-diphenyl-p-phenylenediamine, diphenylamine-acetone reaction product, phenyl-β-naphthylamine, and mixtures thereof.

2. A method for protecting natural rubber against heat and oxidation degradation which comprises compounding the rubber with a synergistic antioxidant mixture consisting essentially of about 0.50 to 1.75 parts of a phosphite selected from the group consisting of decakis (nonylphenyl) heptakis (dipropylene glycol) octaphosphite, tetrakis (nonylphenyl) polypropylene glycol 425 diphosphite, polyphenyl dipropylene glycol phosphite and mixtures thereof, and about 1.50 to 0.25 parts of an amine selected from the group consisting of polymerized 1,2-dihydro-2,2,4-trimethylquinoline, N,N'-di(2-octyl)-p-phenylenediamine, N,N'-diphenyl-p-phenylenediamine, diphenylamine-acetone reaction product, phenyl-β-naphthylamine, and mixtures thereof.

3. A composition with improved protection against heat and oxidation degradation comprising natural rubber and a synergistic mixture which consists essentially of about 0.50 to 1.75 parts of a phosphite selected from the group consisting of decakis (nonylphenyl) heptakis (dipropylene glycol) octaphosphite, tetrakis (nonylphenyl) polypropylene glycol 425 diphosphite, polyphenyl dipropylene glycol phosphite and mixtures thereof, and about 1.50 to 0.25 parts of an amine, selected from the group consisting of polymerized 1,2-dihydro-2,2,4-trimethylquinoline, N,N'-di(2-octyl)-p-phenylenediamine, N,N'-diphenyl-p-phenylenediamine, diphenylamine-acetone reaction product, phenyl-β-naphthylamine and mixtures thereof.

4. The mixture according to claim 1 in which the synergistic mixture is about 0.50 to 1.75 parts of decakis (nonylphenyl) heptakis (dipropylene glycol) octaphosphite and about 1.50 to 0.25 parts of diphenylamine-acetone reaction product.

5. The mixture according to claim 1 in which the synergistic mixture is about 0.50 to 1.75 parts of decakis (nonylphenyl) heptakis (dipropylene glycol) octaphosphite and about 1.50 to 0.25 parts of polymerized 1,2-dihydro-2,2,4-trimethylquinoline.

6. The mixture according to claim 1 in which the synergistic mixture is about 0.50 to 1.75 parts of decakis (nonylphenyl) heptakis (dipropylene glycol) octaphosphite and about 1.50 to 0.25 parts of N,N'-diphenyl-p-phenylenediamine.

7. The mixture according to claim 1 in which the synergistic mixture is about 0.50 to 1.75 parts of decakis (nonylphenyl) heptakis (dipropylene glycol) octaphosphite and about 1.50 to 0.25 parts of N,N'-di(2-octyl)-p-phenylenediamine.

8. The mixture according to claim 1 in which the synergistic mixture is about 0.50 to 1.75 parts of decakis (nonylphenyl) heptakis (dipropylene glycol) octaphosphite and about 1.50 to 0.25 parts of phenyl-β-naphthylamine.

9. The mixture according to claim 1 in which the polyphenyl dipropylene glycol phosphite is tetraphenyl dipropylene glycol diphosphite.

* * * * *

UNITED STATES PATENT AND TRADEMARK OFFICE
CERTIFICATE OF CORRECTION

PATENT NO. : 3,969,315
DATED : July 13, 1976
INVENTOR(S) : Howard C. Beadle

It is certified that error appears in the above–identified patent and that said Letters Patent are hereby corrected as shown below:

Column 1, line 61, "p-butylphenol" should be --p-t-butylphenol--;

Column 1, line 67, "N,N" should be --N,N'--;

Signed and Sealed this

Thirtieth Day of November 1976

[SEAL]

Attest:

RUTH C. MASON
Attesting Officer

C. MARSHALL DANN
Commissioner of Patents and Trademarks